US012664042B2

(12) United States Patent
Soumpholphakdy et al.

(10) Patent No.: US 12,664,042 B2
(45) Date of Patent: Jun. 23, 2026

(54) ANALYSIS AND REMEDIATION OF SERVICE AVAILABILITY BASED ON FAILURES TO TOLERATE

(71) Applicant: Dell Products L.P., Round Rock, TX (US)

(72) Inventors: Steven Soumpholphakdy, Austin, TX (US); Michael L. Burriss, Raleigh, NC (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/893,290

(22) Filed: Sep. 23, 2024

(65) Prior Publication Data

US 2026/0086895 A1     Mar. 26, 2026

(51) Int. Cl.
 *G06F 11/00* (2006.01)
 *G06F 11/07* (2006.01)

(52) U.S. Cl.
 CPC ...... *G06F 11/0793* (2013.01); *G06F 11/0709* (2013.01)

(58) Field of Classification Search
 None
 See application file for complete search history.

(56) References Cited

U.S. PATENT DOCUMENTS

| | | | | |
|---|---|---|---|---|
| 11,586,356 B1* | 2/2023 | Rao | ...................... | G06F 3/0617 |
| 11,663,096 B1* | 5/2023 | Sharma | ..................... | G06F 3/06 |
| | | | | 714/4.11 |
| 2012/0166623 A1* | 6/2012 | Suit | ..................... | G06F 11/3051 |
| | | | | 709/224 |
| 2014/0165060 A1* | 6/2014 | Muller | ................ | G06F 9/45558 |
| | | | | 718/1 |
| 2018/0137019 A1* | 5/2018 | Grobman | .............. | G06F 11/203 |
| 2022/0147390 A1* | 5/2022 | Akinapelli | .......... | G06F 11/3433 |
| 2025/0015940 A1* | 1/2025 | Mehta | ..................... | G06F 11/14 |

* cited by examiner

*Primary Examiner* — Bryce P Bonzo
*Assistant Examiner* — Gabriella Kanani Shelton
(74) *Attorney, Agent, or Firm* — Amin, Turocy & Watson, LLP

(57) ABSTRACT
A method facilitating analysis and remediation of service availability based on failures to tolerate includes, in response to detecting a change to an operational state of a computing cluster, comparing a number of first instances of a computing service running at respective first locations of the computing cluster to a threshold number of instances, the threshold number of instances being defined based on a number of failures, associated with the computing service, that is able to be tolerated; and in response to determining that the number of first instances is equal to the threshold number of instances, initializing at least one second location of the computing cluster for performance of the computing service, the at least one second location being distinct from the respective first locations; and instantiating at least one second instance of the computing service at the at least one second location of the computing cluster.

20 Claims, 16 Drawing Sheets

400

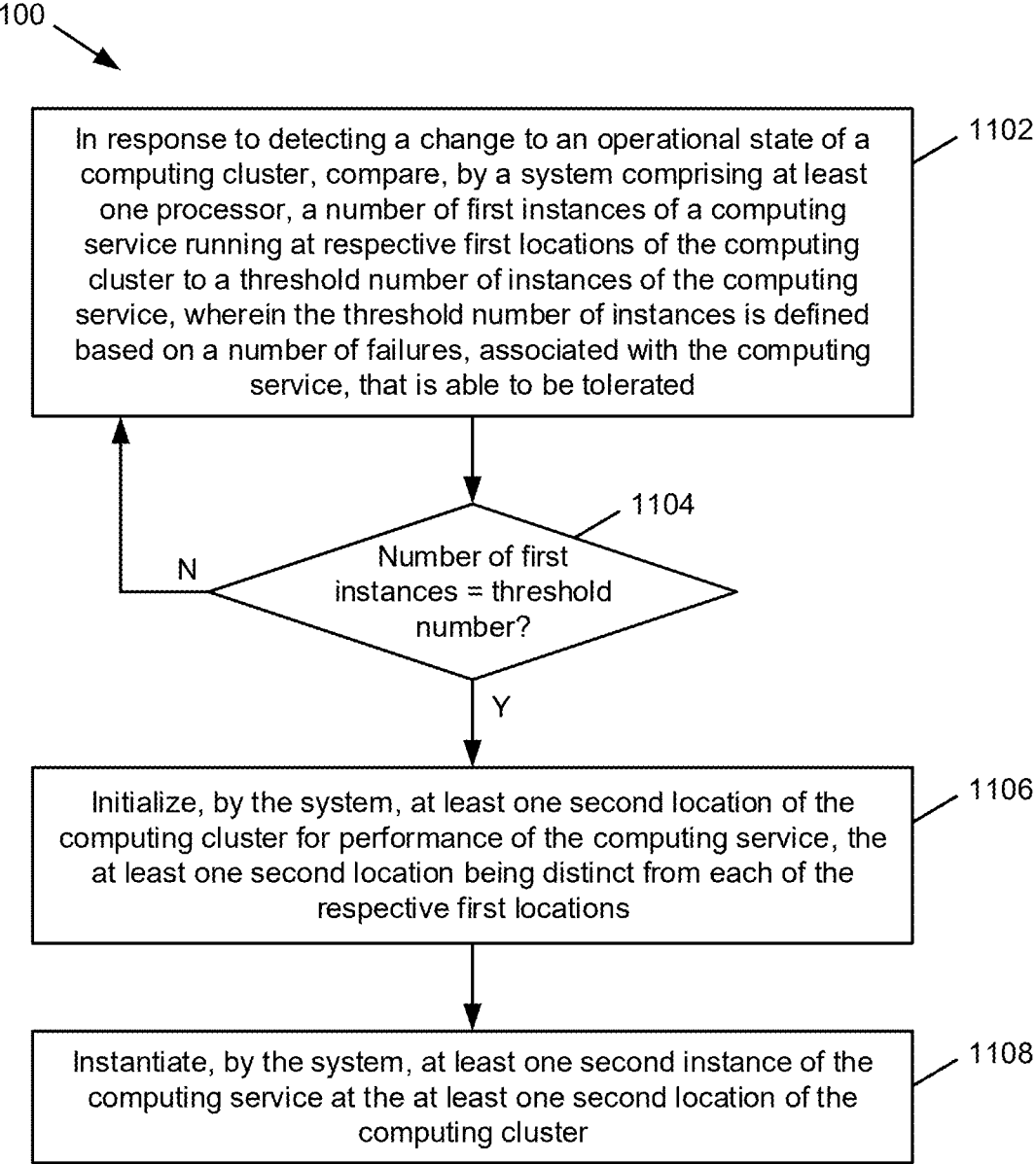

1100

1102
In response to detecting a change to an operational state of a computing cluster, compare, by a system comprising at least one processor, a number of first instances of a computing service running at respective first locations of the computing cluster to a threshold number of instances of the computing service, wherein the threshold number of instances is defined based on a number of failures, associated with the computing service, that is able to be tolerated 1104
N        Number of first instances = threshold number?

Y

1106
Initialize, by the system, at least one second location of the computing cluster for performance of the computing service, the at least one second location being distinct from each of the respective first locations 1108
Instantiate, by the system, at least one second instance of the computing service at the at least one second location of the computing cluster

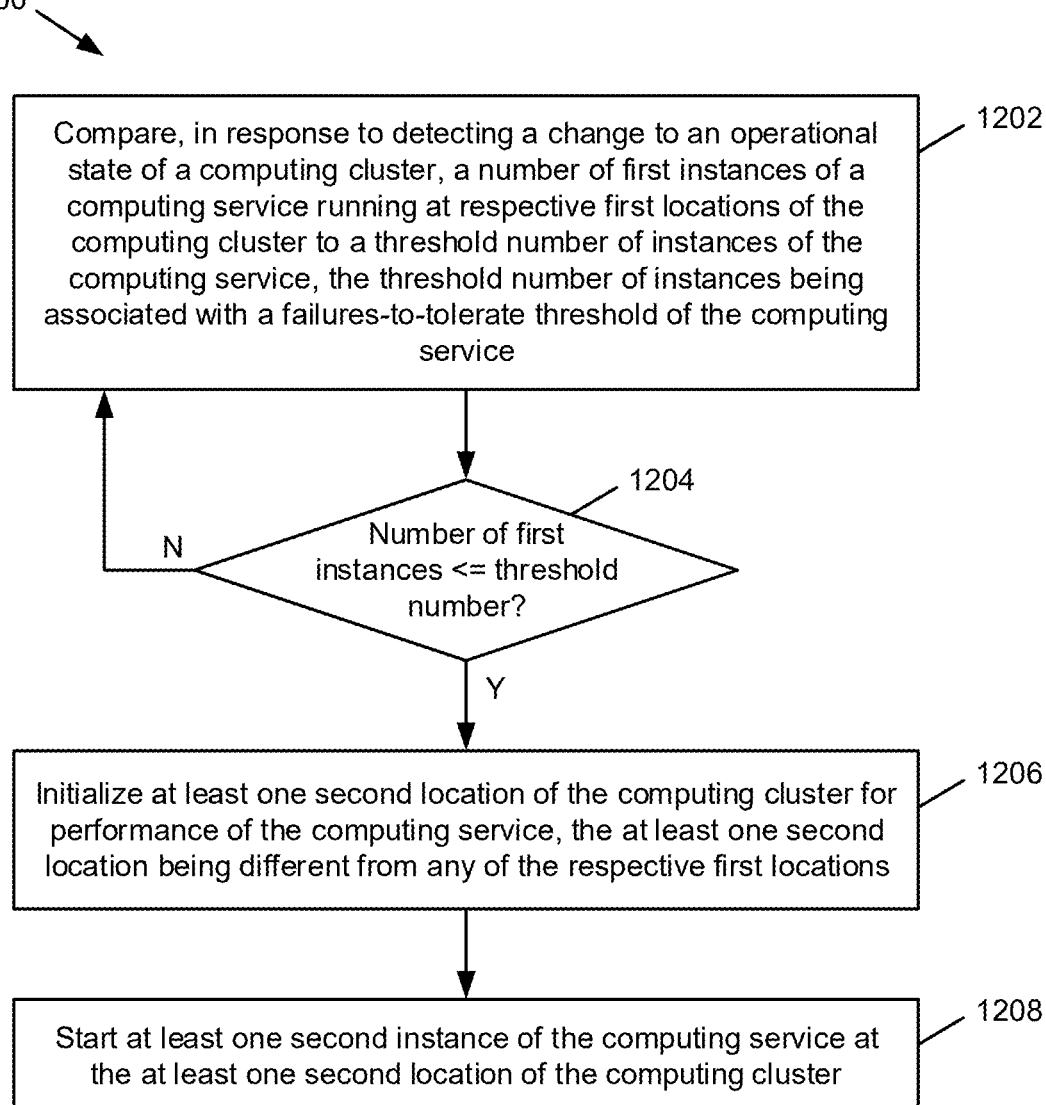

Compare, in response to detecting a change to an operational state of a computing cluster, a number of first instances of a computing service running at respective first locations of the computing cluster to a threshold number of instances of the computing service, the threshold number of instances being associated with a failures-to-tolerate threshold of the computing service

1202

Number of first instances <= threshold number?

1204

N

Y

Initialize at least one second location of the computing cluster for performance of the computing service, the at least one second location being different from any of the respective first locations

1206

Start at least one second instance of the computing service at the at least one second location of the computing cluster

ANALYSIS AND REMEDIATION OF SERVICE AVAILABILITY BASED ON FAILURES TO TOLERATE

BACKGROUND

In a clustered file system, events can arise where node failures (e.g., failures of physical or virtual nodes) can lead to degradation in specific cluster services. In some cases, these services can be critical to functionality of the cluster, and losing several nodes can have a substantial impact on the cluster for this and/or other reasons. While a cluster is generally designed to withstand node failures, once the number of node failures cross a threshold where the failures-to-tolerate (FTT) of the cluster is exceeded, other services in the cluster could also start failing. As those other services start failing, it can be difficult to identify the source or trigger of the failure condition using manual processes.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an implementation, a system is described herein. The system can include at least one processor and at least one memory that stores executable instructions that, when executed by the at least one processor, facilitate performance of operations. The operations can include, in response to detecting a change to an operational state of a computing cluster, comparing a number of first instances of a computing service running at respective first locations of the computing cluster to a threshold number of instances of the computing service, the threshold number of instances being associated with maintaining continued functionality of the computing service on the computing cluster. In response to determining, as a result of the comparing, that the number of first instances of the computing service is no greater than the threshold number of instances, the operations can further include initializing at least one second location of the computing cluster for performance of the computing service, the at least one second location being distinct from each of the respective first locations, and instantiating at least one second instance of the computing service at the at least one second location of the computing cluster.

In another implementation, a method is described herein. The method can include, in response to detecting a change to an operational state of a computing cluster, comparing, by a system including at least one processor, a number of first instances of a computing service running at respective first locations of the computing cluster to a threshold number of instances of the computing service, where the threshold number of instances is defined based on a number of failures, associated with the computing service, that is able to be tolerated. In response to determining that the number of first instances of the computing service is equal to the threshold number of instances, the method can further include initializing, by the system, at least one second location of the computing cluster for performance of the computing service, the at least one second location being distinct from each of the respective first locations, and instantiating, by the system, at least one second instance of the computing service at the at least one second location of the computing cluster.

In an additional implementation, a non-transitory machine-readable medium is described herein that can include instructions that, when executed by at least one processor, facilitate performance of operations. The operations can include comparing, in response to detecting a change to an operational state of a computing cluster, a number of first instances of a computing service running at respective first locations of the computing cluster to a threshold number of instances of the computing service, the threshold number of instances being associated with a failures-to-tolerate threshold of the computing service; and in response to determining that the number of first instances of the computing service is less than or equal to the threshold number of instances, initializing at least one second location of the computing cluster for performance of the computing service, the at least one second location being different from any of the respective first locations, and starting at least one second instance of the computing service at the at least one second location of the computing cluster.

DESCRIPTION OF DRAWINGS

Various non-limiting embodiments of the subject disclosure are described with reference to the following figures, wherein like reference numerals refer to like parts throughout unless otherwise specified.

FIGS. 11-12 are flow diagrams of respective methods that facilitate analysis and remediation of service availability based on FTT in accordance with various implementations described herein.

DETAILED DESCRIPTION

Figure 1:
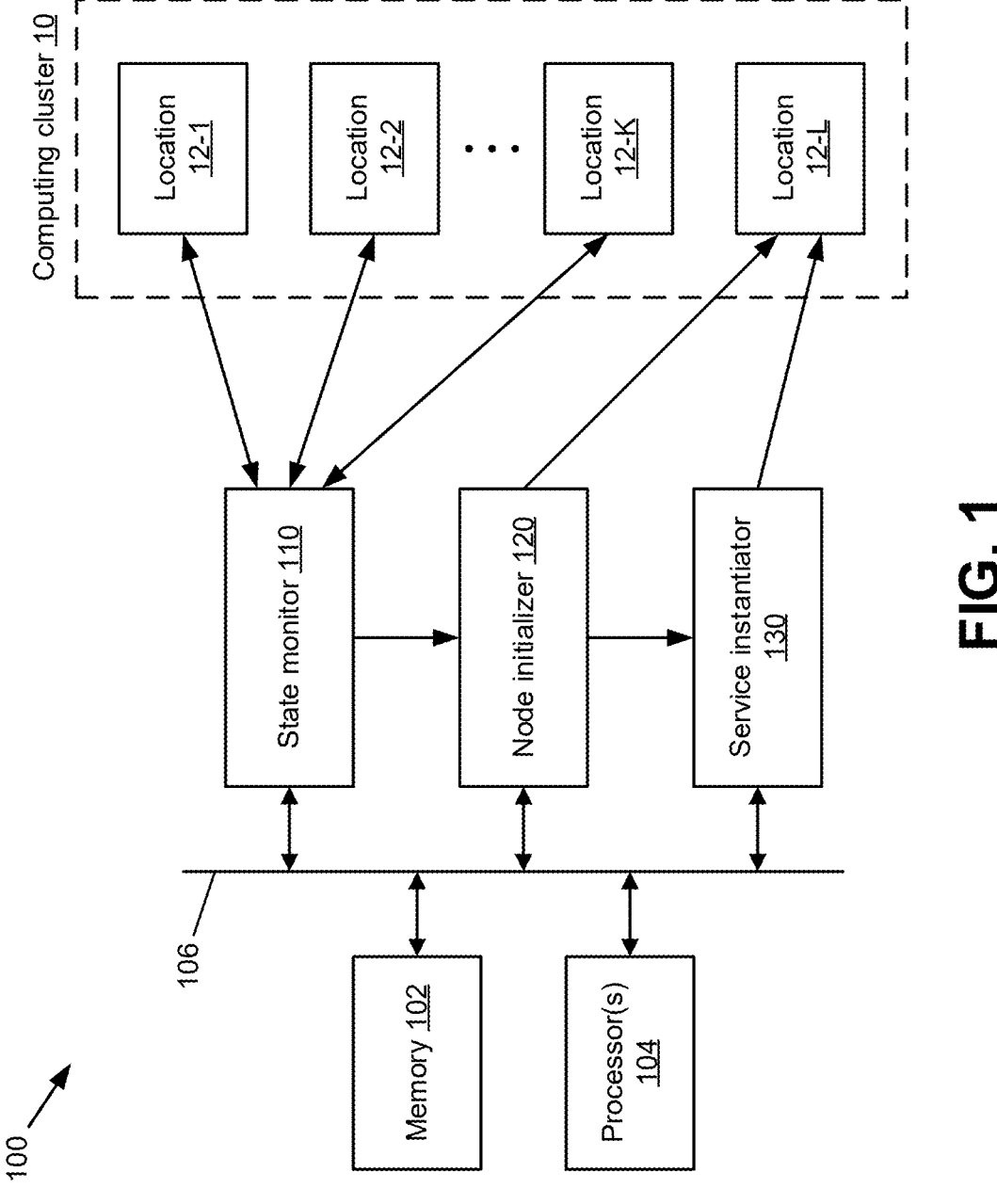
FIGS. 1-7 are block diagrams of respective systems that facilitate analysis and remediation of service availability based on failures to tolerate (FTT) in accordance with various implementations described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring subject matter.

As noted above, failures of physical or virtual nodes and/or other locations of a computing cluster can lead to degradation of various services associated with a clustered file system running on the cluster, and these failures can cause additional service failures once a failures-to-tolerate (FTT) threshold is reached. An example of this is a situation in which a service requires a majority of nodes to make changes to the cluster membership configuration and/or other configuration properties of the cluster, and the loss of a sufficient number of nodes to yield a quorum loss (e.g., $N/2+1$ operational nodes, where N is the total number of nodes running the service) can lead to cascading failures. As another example, a service may have a FTT that allows it to withstand a single failure, in which case additional failures would lead to cascading failures.

In the event of a cascading failure, it can be difficult in conventional systems to determine the cause of the failure, e.g., to effectively restore the system to operational status. Root cause analysis in conventional systems often involves parsing through system logs containing potentially unrelated events which must be pieced together to determine the cause of the failure. Accordingly, it would be desirable to implement techniques that facilitate more effective root cause analysis and failure mitigation.

To the foregoing and/or related ends, implementations provided herein provide techniques that, upon detection of a failure (e.g., to a service, a hardware or virtual node, etc.), analyze the current state of the system and perform appropriate mitigations automatically if the system is nearing and/or crossing into a degraded state based on the specified FTT of the affected cluster services. By way of example, implementations herein can facilitate automated alerts on reaching various FTT-related thresholds, which can simplify some of the triage/root cause analysis that takes place, e.g., when failures occur during internal development and/or at a customer site. For instance, instead of having to sift through several log messages or alerts that are mostly noise due to another service being degraded, a user can be notified, with the appropriate severity, as their cluster nears or crosses a threshold of failures.

In addition, implementations described herein can facilitate automatic remedial actions in response to detecting a failure event, which can significantly improve system uptime by eliminating the time delay associated with manual detection and remediation of failures. For instance, in deployment environments in which there are facilities available to join nodes on demand, implementations described herein can respond to a critical threshold being met by spinning up diskless (non-storage) nodes in order to provide additional nodes to host the services that are at risk. Spinning up a diskless node in this manner can reduce the cost associated with bringing up the service, since a node can be quickly brought up without data drives or a journal device in order to allow the service to still be operational while any issues on down/failed nodes are addressed. Additionally, in cases in which services may not need to run on all nodes of a cluster, implementations described herein can facilitate moving a service from one node to another to maintain FTT.

By utilizing various implementations as described herein, various advantages that can improve the performance of a clustered computing system can be realized. These advantages can include, but are not limited to, the following. The information provided to a system administrator or other user relating to service or node failures in a computing system can be improved (e.g., by providing more detailed and/or more targeted information, providing the information earlier, etc.), reducing the amount of time associated with manual log analysis, simplifying the process of performing remedial actions, and preventing system downtime. Security buffers can be provided for failing service instances, e.g., by spinning up new diskless nodes or the like, thereby improving the resiliency of the system to service or node failures and reducing or eliminating system downtime associated with FTT thresholds being exceeded. Other advantages are also possible.

With reference to the drawings, FIG. 1 illustrates a block diagram of a system 100 that facilitates analysis and remediation of service availability based on FTT in accordance with various implementations described herein. System 100 as shown in FIG. 1 includes executable components, e.g., a state monitor 110, a node initializer 120, and a service instantiator 130, each of which can operate as described in further detail below. In an implementation, the components 110, 120, 130 of system 100 can be implemented in hardware, software, or a combination of hardware and software. By way of example, the components 110, 120, 130 can be stored on at least one memory (e.g., a memory 102) and executed by at least one processor (e.g., processor(s) 104). An example of a computer architecture including a processor and memory that can be used to implement the components 110, 120, 130, as well as other components as will be described herein, is shown and described in further detail below with respect to FIG. 13. As further shown in FIG. 1, the executable components 110, 120, 130, the memory 102, the processor 104, and/or other elements of system 100 can communicate with each other via a bus 106 and/or other components that provide intercommunication between various elements of system 100.

Additionally, it is noted that the functionality of the respective components shown and described herein can be implemented via a single computing device and/or a combination of devices. For instance, in various implementations, the state monitor 110 shown in FIG. 1 could be implemented via a first device, the node initializer 120 could be implemented via the first device or a second device, and the service instantiator 130 could be implemented via the first device, the second device, or a third device. Also, or alternatively, the functionality of a single component could be divided among multiple devices in some implementations.

As will be described in further detail below, the components 110, 120, 130 of system 100 can interact with one or more locations 12 of a computing cluster 10, such as physical or virtual nodes, cloud native containers, or the like. It is noted that one or more devices on which the components 110, 120, 130 are implemented could themselves be part of the computing cluster 10, or alternatively one or more devices implementing system 100 could be separate from the computing cluster 10 and communicate with one or more devices of the computing cluster 10 through any suitable wired and/or wireless communication technology(-ies).

The computing cluster 10 shown in FIG. 1 can run a clustered file system, which can be composed of a number of nodes, e.g., physical nodes or virtual machines (VMs), or other suitable locations 12 from which service instances can be run. Depending on the type of service, a given service can run on some or all of the locations 12, here K locations 12-1 through 12-K. It is noted that the numbering convention used for the locations 12-1 through 12-K of the computing cluster 10 in FIG. 1 is merely for purposes of illustration and is not intended to imply any number of nodes or other locations 12 within the computing cluster 10. For instance, in various implementations, there could be any number of locations 12 of the computing cluster 10, including one location 12 or multiple locations 12, that can run respective first instances of a computing service as observed by the state monitor 110.

Some services that can be associated with the computing cluster 10 can have specific FTT thresholds. By way of a specific, non-limiting example, a cluster configuration service used for making cluster membership changes can require N/2+1 operable instances, where N is the total number of nodes or other locations 12 of the computing cluster 10, since the service can require a quorum to make eventually consistent changes to the cluster configuration. By utilizing system 100 as described herein, as failures to the computing cluster 10 result in the computing cluster 10 nearing inability to meet these FTT requirements, remedial actions can be performed automatically, such as triggering alerts to notify a system administrator or other user, temporarily remediating the failures until failing nodes are brought back to health or conditions for failing services can be resolved, and/or other actions.

With reference now to the components of system 100, the state monitor 110 can detect changes to the topology and/or operating state of the computing cluster 10, either directly or indirectly via cluster management policies or services that convey information regarding changes to the cluster topology back to the state monitor 110. In response to detecting a change to the operational state of the computing cluster 10 (e.g., a node or other location 12 of the computing cluster 10 going up or down, a service instance running at one of the locations 12 of the computing cluster 10 failing, etc.), the state monitor 110 can compare a number of first instances of a computing service running at respective locations of the computing cluster 10, represented in FIG. 1 as locations 12-1 through 12-K, to a threshold number of instances of that service, e.g., a FTT threshold or other threshold associated with maintaining continued functionality of the service on the computing cluster 10.

In the event that the state monitor 110 determines, as a result of comparing the number of first instances of the computing service to the threshold number of instances, that the number of first instances of the computing service running on the computing cluster 10 is no greater than (less than or equal to) the threshold number of instances, the state monitor 110 can trigger operation of the node initializer 120 and service instantiator 130 to automatically provide one or more additional locations 12-L for the service to prevent cascading failures. More particularly, the node initializer 120 can initialize at least one new second location 12-L of the computing cluster 10 for performance of the computing service, and the service instantiator 130 can instantiate at least one second instance of the computing service at these newly initialized location(s) 12-L. While only one additional location 12-L is shown in FIG. 1 for simplicity, it is noted that the node initializer 120 and service instantiator 130 can facilitate provisioning of any suitable number of new service instances, e.g., an amount of new instances that is sufficient to ensure FTT thresholds remain met.

Figure 3:
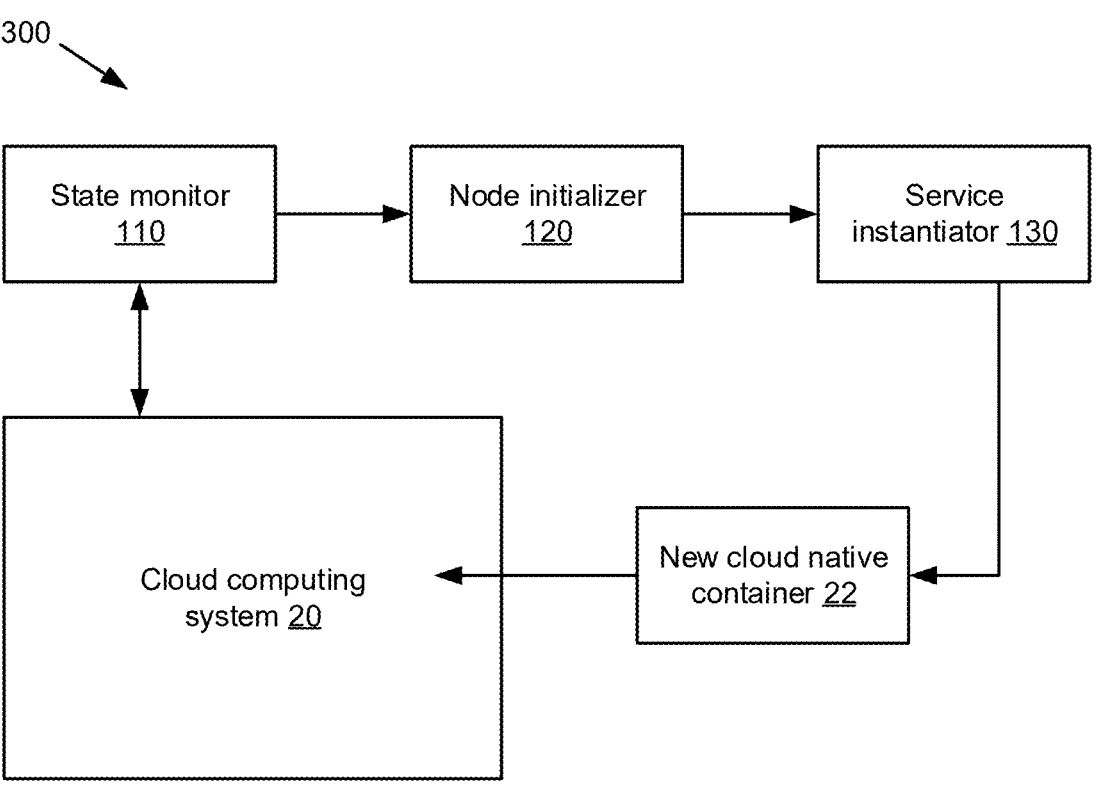

In some implementations, e.g., as will be described in further detail below with further reference to FIG. 1 and with reference to FIG. 3, the location(s) 12-L used to run the new service instances can be spun up by the node initializer 120 and service instantiator 130 as new cluster nodes or other service locations. In other implementations, e.g., as will be described in further detail below with respect to FIG. 6, the location(s) 12-L used to run the new service instances can include existing node devices or other locations of the computing cluster 10 that are not running the service but have the capabilities (e.g., in hardware and/or software) to do so.

Figure 2:
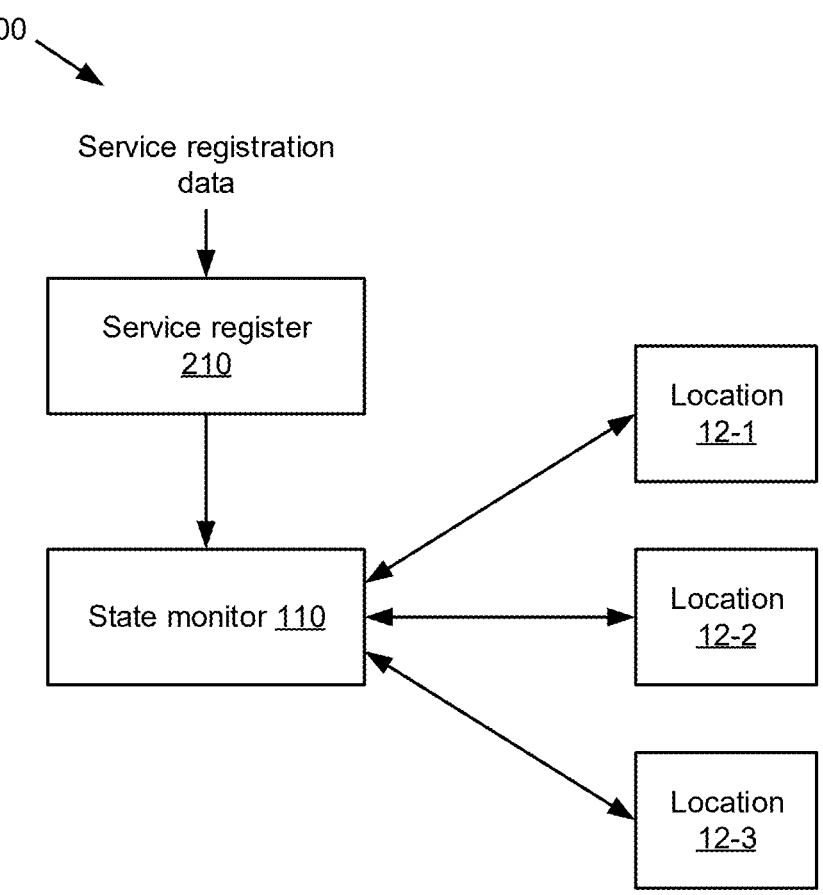

Turning now to FIG. 2, a block diagram of another system 200 that facilitates analysis and remediation of service availability based on FTT is illustrated. Repetitive description of like parts described above with regard to other implementations is omitted for brevity. System 200 as shown in FIG. 2 includes a service register 210, which can collect registration information from respective computing services running at respective cluster locations 12 associated with system 200. For instance, upon startup of a service, the service can be configured to communicate with the service register 210, e.g., to provide registration data relating to the FTT thresholds of the service, the requirements of the service (e.g., in terms of hardware or software capabilities, etc.), or other information associated with the service. In addition, the service can, either upon startup or at another suitable time, request FTT analysis by the state monitor 110 via the service register 210.

In some cases, a service may have an FTT threshold that is not compatible with the cluster on which the service runs. For instance, a service could have a FTT threshold of five nodes while only four or less nodes are present in the system. In such a scenario, the service register 210 could modify the FTT requirement provided by the service, e.g., from five nodes in the above example to N nodes, where N is the total number of nodes in the cluster, prevent FTT analysis of the service, or take other suitable actions. If the number of cluster nodes is subsequently brought up to the originally specified FTT threshold, the service register 210 can then facilitate FTT analysis of the service using the original FTT threshold.

The service register 210 of system 200 can allow services with specific FTT requirements to register. As part of the registration process, each service can identify their FTT thresholds (e.g., $>=N/2+1$, $>2$, etc.), and optionally any additional thresholds the services intend to trigger upon. For example, a service having an FTT threshold of $>=N/2+1$ could define event thresholds such as the following:

Info: Number of alive service instances$=N/3$

Warning: Number of alive service instances$=N/2+2$

Critical: Number of alive service instances$=N/2+1$

Other event thresholds could also be defined. As used above, "critical" denotes the state where if the number of alive instances goes below the critical threshold, the service may cease being operational. Actions that can be taken based on non-critical event thresholds are described in further detail below with respect to FIG. 7.

In some implementations, information associated with a given service as provided to the service register 210 can be augmented or altered by a system administrator or other user. For instance, the service register 210 could permit a user to modify the FTT thresholds associated with a service, or define additional FTT thresholds, for a given system. The service register 210 can then maintain these user-defined thresholds in addition to, or in place of, thresholds provided by the service.

Returning now to FIG. 1, operation of the state monitor 110, e.g., via an FTT analyzer service, can be invoked any time a change in topology (e.g., a node addition or removal, an unplanned down node, etc.) or a change in service state (e.g., a service going up or down on a given node) is observed. If these and/or other triggers are observed, the state monitor 110 can run an analysis given the current state of the service in the computing cluster 10. More particularly, the state monitor 110 can determine the number of instances of the service running in the computing cluster 10 and compare that number of instances against the expected number of instances and/or the different thresholds defined when the service registered with the service register 210 as described above with respect to FIG. 2.

If the state monitor determines that none of the defined thresholds have been crossed, no further actions are performed. Otherwise, if one or more thresholds have been crossed, the state monitor 110 can trigger actions such as sending an alert to notify a system user (e.g., as described below with respect to FIG. 7). Additionally, the state monitor 110 can consider conditions under which the services will no longer be operational. Once the state monitor 110 determines that a critical threshold has been reached, it can trigger actions to ensure the service maintains its availability.

In various implementations, there are several use cases that can cause the state monitor 110 to take different actions when service degradation nears. These use cases can depend on whether the computing cluster 10 is associated with a cloud deployment or a hardware deployment, whether (in the case of a hardware deployment) additional hardware resources are available, whether a service runs on a subset of cluster locations and additional locations are present to which the service can be moved, and/or other factors. Actions that can be taken in connection with respective ones of these use cases are described below.

Cloud Deployments

With reference again to FIG. 1, in scenarios in which the computing cluster 10 is associated with a cloud deployment (e.g., with the ability to spin up resources on demand), the node initializer 120 can take the appropriate actions to spin up a diskless node when the state monitor 110 detects that the computing cluster 10 is nearing a critical threshold. This process can include expanding the backend networking internet protocol (IP) range to accommodate the node addition, making a cloud provider application programming interface (API) call to spin up a virtual machine (VM), and then triggering the node add operation once the new node has been seen on the backend network by the rest of the cluster. Upon completion of these operations, the computing cluster 10 can have an extra node, e.g., corresponding to location 12-L as shown in FIG. 1, that can host any services that are at or near a critical threshold. In some implementations, this new node can be configured to be in the cluster merely to host services, e.g., as opposed to acting as an accelerator node or otherwise participating on the frontend or handling client load.

To restate the above with reference to FIG. 1, a computing cluster 10 associated with a cloud computing system can include respective virtual nodes (e.g., VMs), which can correspond to the locations 12-1 through 12-K shown in system 100. In response to identifying, as a result of a topology change to the computing cluster 10, that the number of locations 12-1 through 12-K hosting a given service is either equal to or less than the FTT threshold of that service, the node initializer 120 can activate a new virtual node, e.g., corresponding to location 12-L shown in system 100, for operation within the computing cluster. This new node can be configured, e.g., by the node initializer 120, as a diskless (headless, non-storage) node, thereby minimizing the impact of the new node on the computing cluster 10 while still providing improved service resiliency. Upon activation and configuration of the new node by the node initializer 120, the service instantiator 130 can then start any service(s) on the new node, e.g., to ensure that FTT thresholds for respective services continue to be met.

While the above-described implementation relates to the addition of temporary (virtual) node devices in a cloud computing system, other implementations could add additional service instances to a computing cluster 10 in other ways. For instance, as shown by system 300 in FIG. 3, the state monitor 110 could monitor the performance of a cloud computing system 20, which could include virtual nodes and/or other physical or logical subdivisions. For instance, in addition to or in place of VMs, the cloud computing system 20 shown in FIG. 3 could include container instances, e.g., Kubernetes native containers or other cloud native containers, that can host microservices or other suitable services associated with the cloud computing system 20. In such an implementation, the node initializer 120 and/or service instantiator 130 of system 300 can, in addition to and/or instead of adding a new temporary node as described above, instantiate a new cloud native container 22 within the cloud computing system 20, such that instance(s) of any service(s) needed for maintenance of FTT can be instantiated within the cloud native container 22.

Returning to an implementation in which the locations 12 shown in FIG. 1 correspond to (physical or virtual) nodes, as soon as the node failures handled by system 100 as described above have been handled (e.g., by a system administrator or other user) and nodes can re-merge into the computing cluster 10, respective conditional node(s) (e.g., corresponding to location 12-L as shown in FIG. 1) can be detected and removed.

Figure 4:
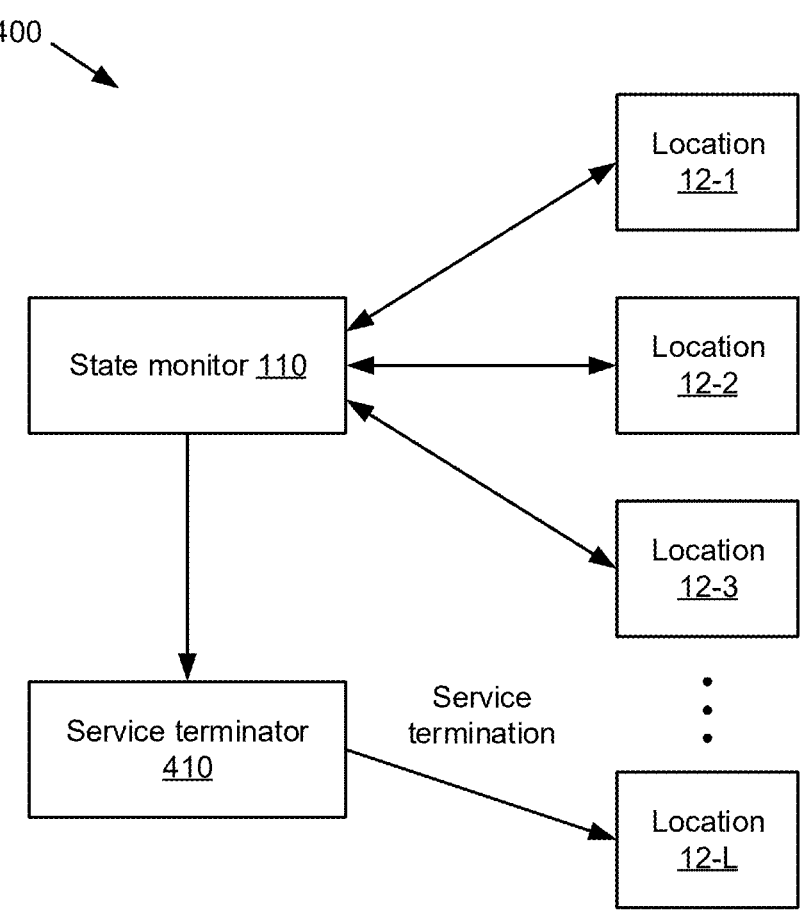

To illustrate the above point more generally, FIG. 4 shows a system 400 that can facilitate termination of a service in response to remediation of a failed node or other service location. As shown by FIG. 4, the state monitor 110 of system 400 can detect, subsequent to a temporary location 12-L being added for a given service as described above with respect to FIG. 1, that another change to the topology or operational state of the associated computing cluster, subsequent to an original change that caused the addition of location 12-L, has occurred. In response to detecting this change, the state monitor 110 can again compare the number of instances of a given service running in the cluster to a FTT threshold and/or another threshold number of instances of that service. If, as a result of this comparison, the state monitor 110 determines that the number of instances of the service is greater than the FTT threshold, the state monitor 110 can determine that the temporary service instance as hosted on the temporary location 12-L is no longer needed. As a result, the temporary service instance can be terminated at the temporary location 12-L, e.g., by a service terminator 410.

Figure 5:
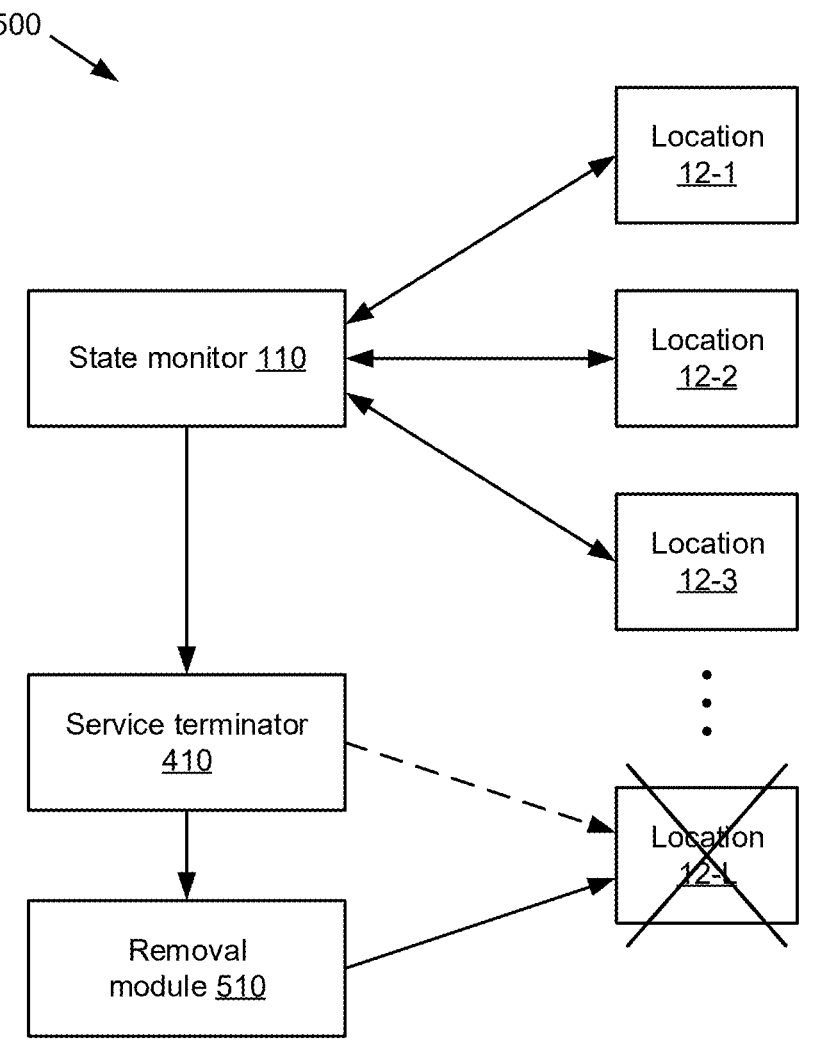

Additionally, as shown by system 500 in FIG. 5, once the temporary service instance at the temporary location 12-L has been stopped by the service terminator 410, the temporary location 12-L can additionally be removed from the cluster, e.g., by a removal module 510. In an implementation, operation of the removal module 510 can be triggered in response to the location 12-L being a node or other physical or logical structure that is determined to no longer be running any service instances, e.g., as a result of operation of the service terminator 410 as described above.

In an implementation in which a cloud environment utilizes cloud orchestration, replacement of a failed node can be coordinated with the resources created by the node initializer 120 as described above, e.g., such that a user will not see any disruption to their services while also facilitating self-healing and reduction of the time window in which their cluster is degraded.

Subsequent to removing the temporary VM or other node as described above with respect to FIGS. 4-5, e.g., resulting from determining that the cluster is no longer at a critical FTT threshold, any alerts issued by the system (e.g., as will be described in further detail below with respect to FIG. 7) can be canceled, and normal system operation can continue.

Hardware Deployments with Available Hardware Resources

With further reference to FIG. 1, in scenarios in which the computing cluster 10 is associated with a hardware deployment (e.g., an on-premises computing system), system 100 can leverage any spare nodes sitting on the same backend switch as the cluster 10, and/or other available hardware resources, to serve as temporary service locations in the event of a failure event. For instance, the node initializer 120 of system 100 can be configured to bring additional (spare) nodes into the computing cluster 10 once imminent degradation (e.g., due to topology changes or other events detected by the state monitor 110 as described above) is detected.

In an implementation, a process that can be used by the node initializer 120 to bring in a spare hardware node can be similar to that described above for adding a new VM to a cloud deployment, with two differences:

1) In some scenarios, the node initializer 120 can be configured not to utilize a spare node as a temporary service location simply in response to the node being seen on the backend by the cluster. Instead, an interface can be made available, e.g., to a system user, to configure system 100 to input an approved list of nodes that can be used for remediation. Nodes can be identified on such a list by serial number and/or any other suitable identifier.

2) If the node(s) to be joined by the node initializer 120 are configured as storage nodes, the node initializer can temporarily reconfigure the node(s) as diskless (non-storage) nodes prior to being added. This can be done, e.g., to avoid rebalancing any data that is written to a temporary node that is configured as a storage node. In an implementation, the node initializer 120 can make an enhancement to the cluster join procedure utilized by system 100 to change the identity of a node being brought in temporarily to be a diskless node, enabling the node to be brought in as such. In some implementations, a node added in this manner can be brought into the cluster as an accelerator node, e.g., that can process client computing load in addition to hosting services. Alternatively, the node can be brought in as a limited-purpose FTT maintenance node that only provides fault tolerance for services and performs limited, or no, other functions.

Deployments Where Services Run on Subsets of Nodes

In some operating environments (e.g., Kubernetes, etc.), it can be the case where not all services run on all nodes in a cluster. In such a scenario, when a service registers for FTT analysis (e.g., as described above with respect to FIG. 2), the service can provide a set of capabilities needed to run the service, such as hardware capabilities, software capabilities, or the like. For example, a given service may require a network interface card (NIC) that supports at least a given speed, hardware components of at least a given hardware generation, etc. As another example, a given service could require specific software features such as remote direct memory access (RDMA) or the like. Other examples are possible.

Figure 6:
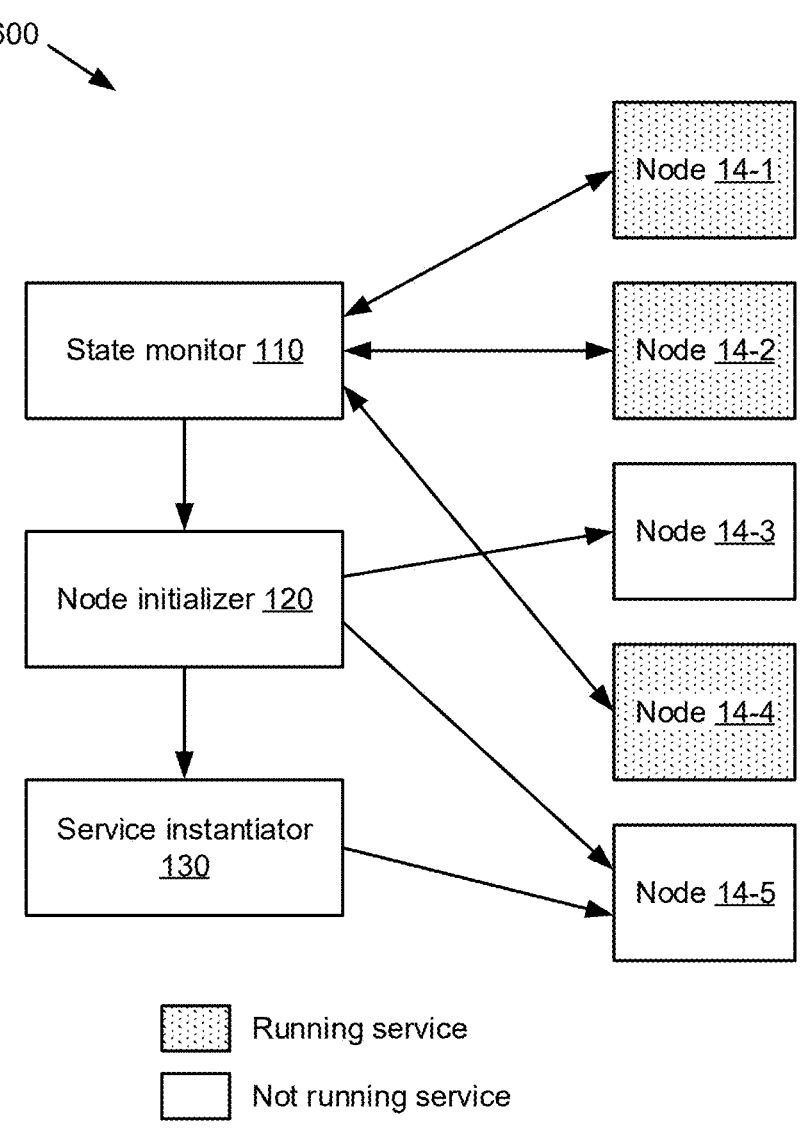

An example implementation that can be utilized for an operating environment such as that described above is shown by system 600 in FIG. 6. As shown by FIG. 6, when the state monitor 110 determines that a new instance of a service is needed, e.g., based on the FTT threshold of that service as described above, the node initializer 120 can determine whether there are nodes already the cluster that are capable of running the service (e.g., based on the capabilities of the respective nodes and the requirements of the service) and are not already running the service. If such nodes exist, the node initializer 120 and/or service instantiator 130 can then spin up the service on those nodes, i.e., instead of attempting to initialize new nodes.

For instance, in the non-limiting example of FIG. 6, a cluster has five nodes 14-1 through 14-5, where a given service is running on nodes 14-1, 14-2, and 14-4. In the event that the state monitor 110 determines that a new instance of the service is needed, the node initializer can determine whether one or more nodes of the cluster that are not running the service, here nodes 14-3 and 14-5, are capable of running the service based on the configurations of those nodes. If one or both of these nodes are determined to be capable of running the service, the node(s) can be selected to host the service and, in response, the service instantiator 130 can start the service on the selected node(s).

Hardware Deployments with No Available Resources

For hardware deployments with no spare nodes or other resources, it can be difficult to spin up cloud resources and join them to the cluster services. As a result, the state monitor can facilitate notifying an end user when a degraded state for a given service is approaching, e.g., based on the specific thresholds for that service, as will be described below.

Figure 7:
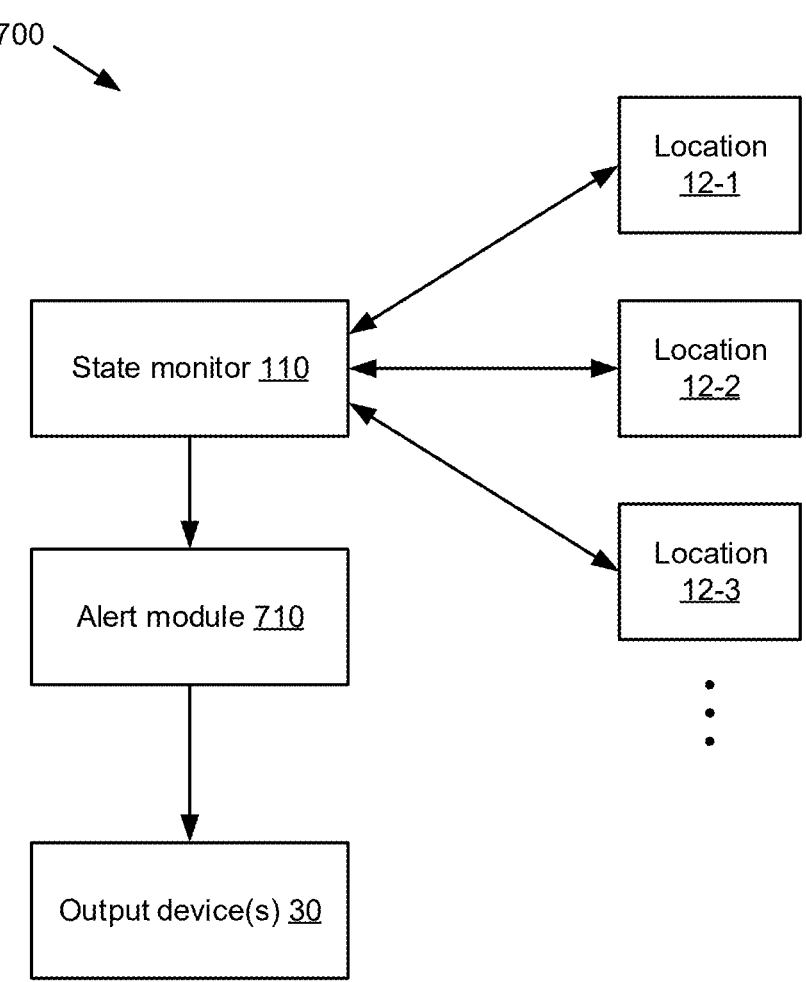

Turning next to FIG. 7, an example system 700 that facilitates providing notifications associated with service FTT thresholds is illustrated. Repetitive description of like parts described above with regard to other implementations is omitted for brevity. System 700 as shown in FIG. 7 includes a state monitor 110 that can compare the number of instances of a given service running at respective cluster locations 12 to FTT thresholds of the service, e.g., the Info, Warning, and Critical thresholds described above with respect to FIG. 2, and/or other thresholds. In response to the state monitor 110 determining that the number of active service instances is no greater than one or more of these thresholds, an alert module 710 can generate an event notification to one or more output devices 30, such as a display device or the like, that can provide information to a user to facilitate remedial actions by the user. In addition to providing an alert directly to one or more output devices 30, the alert module 710 can also generate an event log or the like, which could then be displayed or otherwise output via one or more output devices 30 by a user.

In some implementations, the alert module 710 can be configured to provide alerts for FTT thresholds that are the same as, or different from, FTT thresholds that trigger automatic remedial actions as described above. For example, a given system can be configured with a first FTT threshold, e.g., at N instances of a service, that triggers automatic corrective action as well as a second FTT threshold, e.g., at N+X instances of the service for some nonzero number X, that triggers an event notification but does not cause automatic corrective actions to be performed.

One or more implementations as described above can facilitate a system to identify and/or alert on imminent service degradation and spin up temporary resources (e.g., cloud or physical resources) to maintain FTT requirements. For instance, for a list of services, each of which may have their own FTT thresholds, an FTT analyzer service can determine when an imminent service degradation will happen and add temporary services to the cluster (e.g., physical or virtual nodes configured as diskless nodes) such that the service can continue to be operational. Once the failing nodes have been remediated, the temporary resources can then be destroyed.

One or more implementations as described above can also facilitate maintenance of FTT by moving services from one node to another, e.g., based on node capabilities. For instance, if a given service that is running only on a subset of nodes in a cluster goes down and degradation to the service is imminent, the FTT analyzer service can query the cluster for nodes that are eligible to run the service. Eligible nodes for a given service can be based on the node capability criteria specified when the service registered with the FTT analyzer. If a node is found to be eligible, the FTT analyzer can then move/migrate the service from the failed node to the eligible one.

One or more implementations as described above can also facilitate join enhancements to a cluster, e.g., by instructing a joining node to convert to diskless ahead of joining the cluster. For instance, in a scenario in which there are spare nodes on the same backend switch as the cluster, the cluster can initiate the joining of those spare nodes. In order to reduce the penalty of adding and removing the node from the cluster, the node can be instructed at join time to convert itself from a storage node to a diskless node and reboot.

Upon reboot, the conversion can be applied and the node can join as diskless. It is noted that the terms "diskless" and "non-storage" refer only to storage of client data, as a "diskless" node could still have and utilize storage drives that are not used for the clustered file system. By converting a temporary node to diskless in this manner, the amount of time needed to remove the temporary nodes from the cluster once the failed nodes have been remedied can be reduced.

Figure 8A:
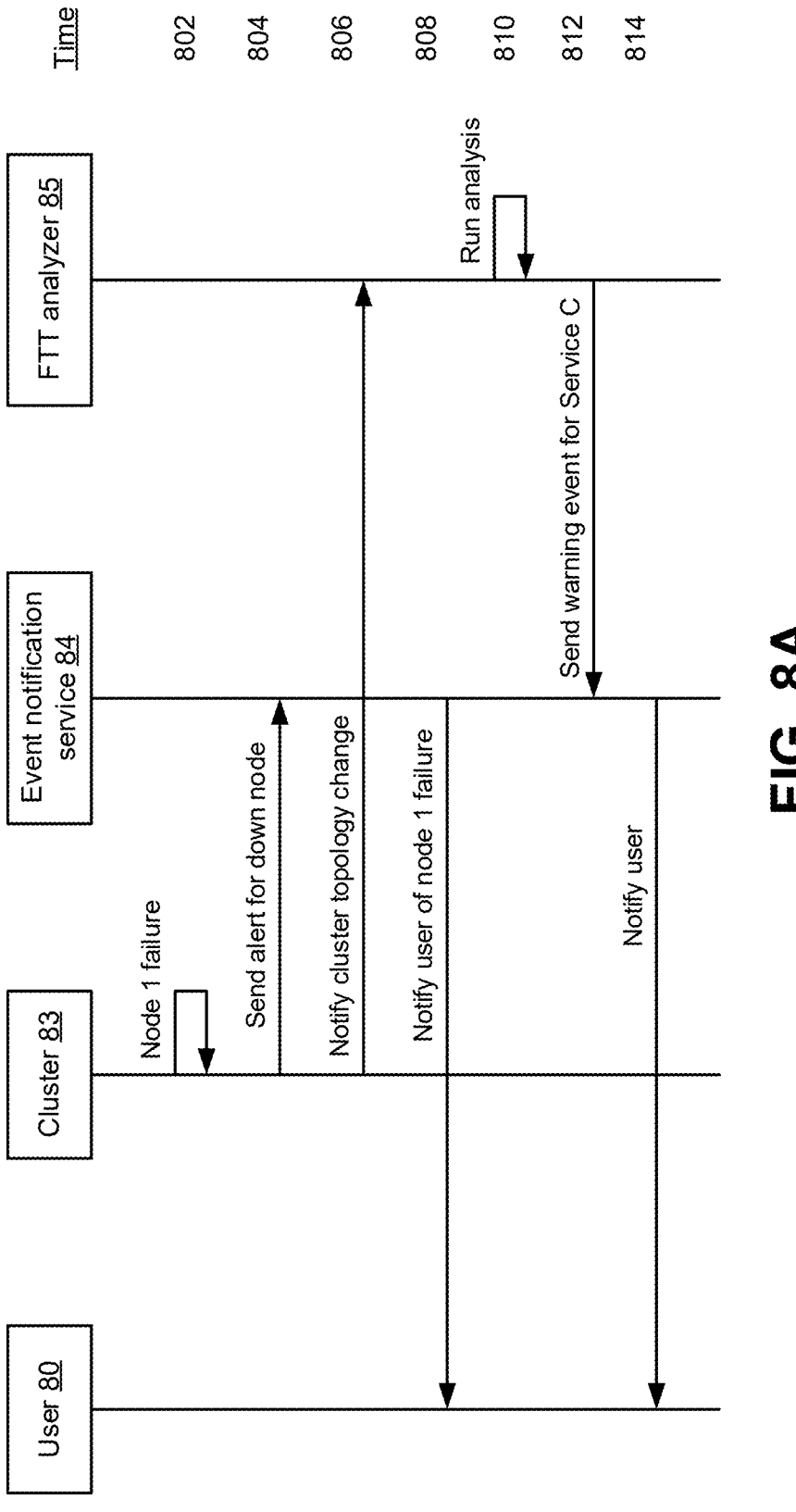
FIGS. 8A-8C, 9, and 10A-10B are diagrams illustrating respective messaging flows that can be utilized in connection with one or more implementations described herein.
Figure 8B:
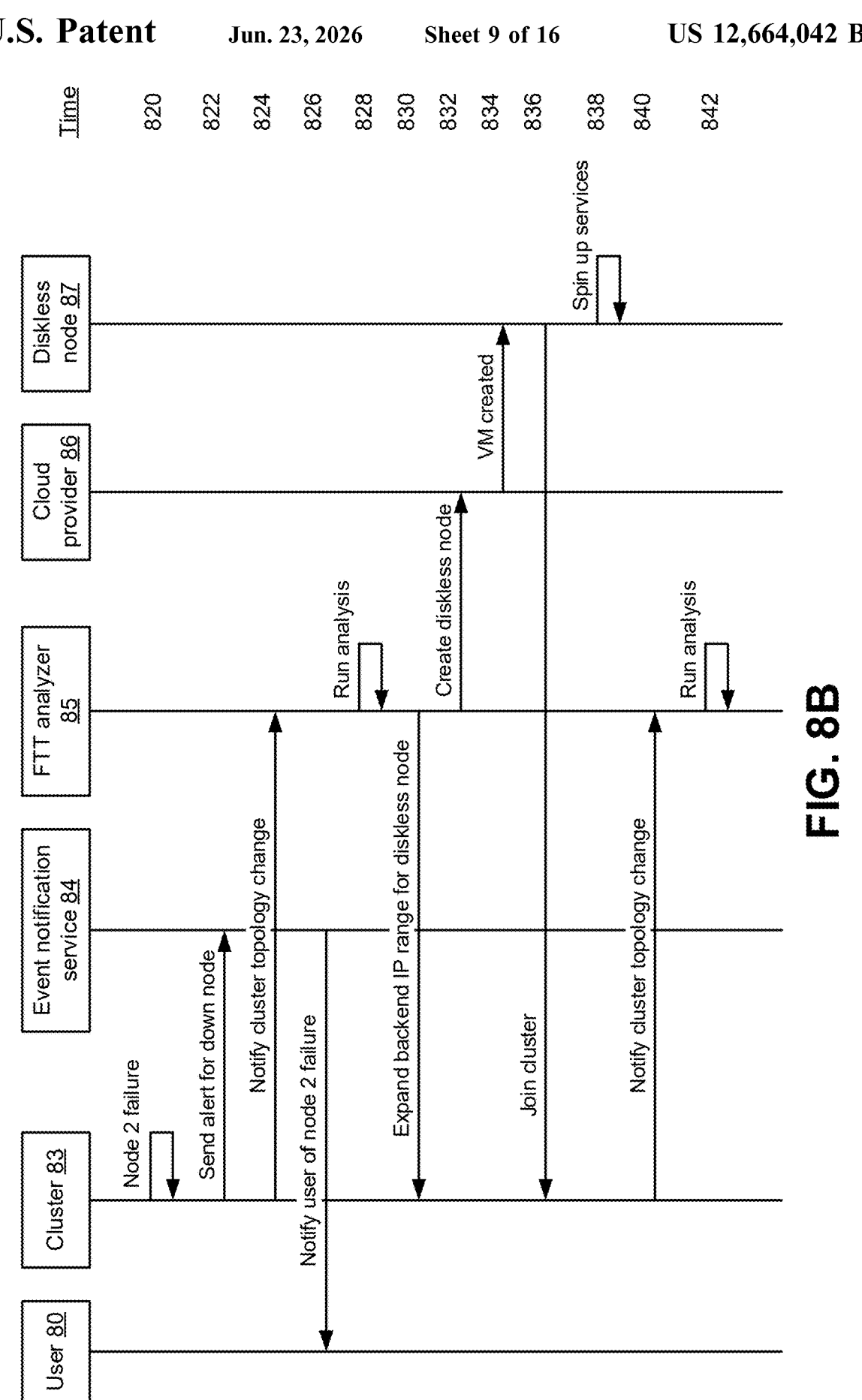
Figure 8C:
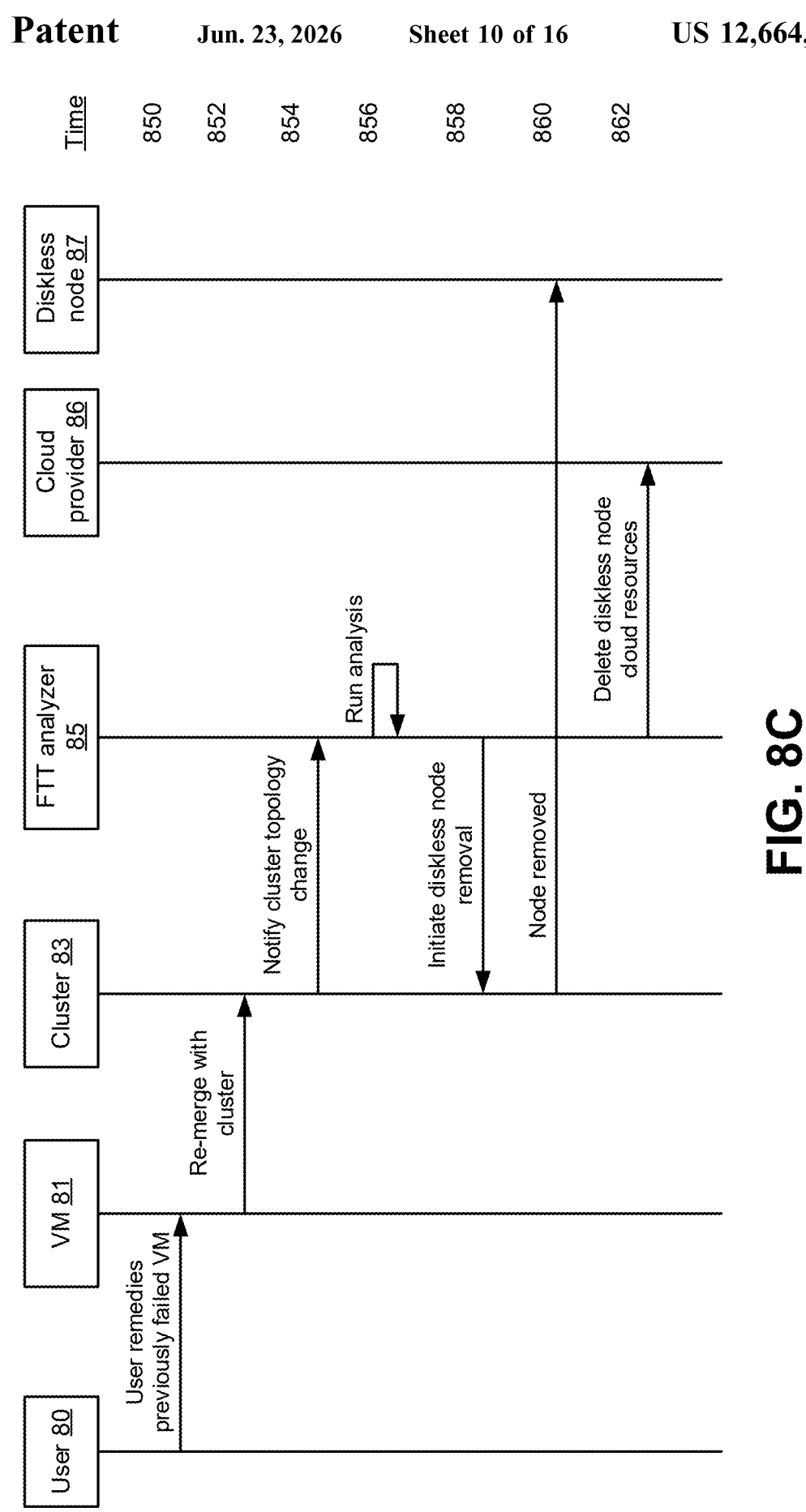
Figure 9:
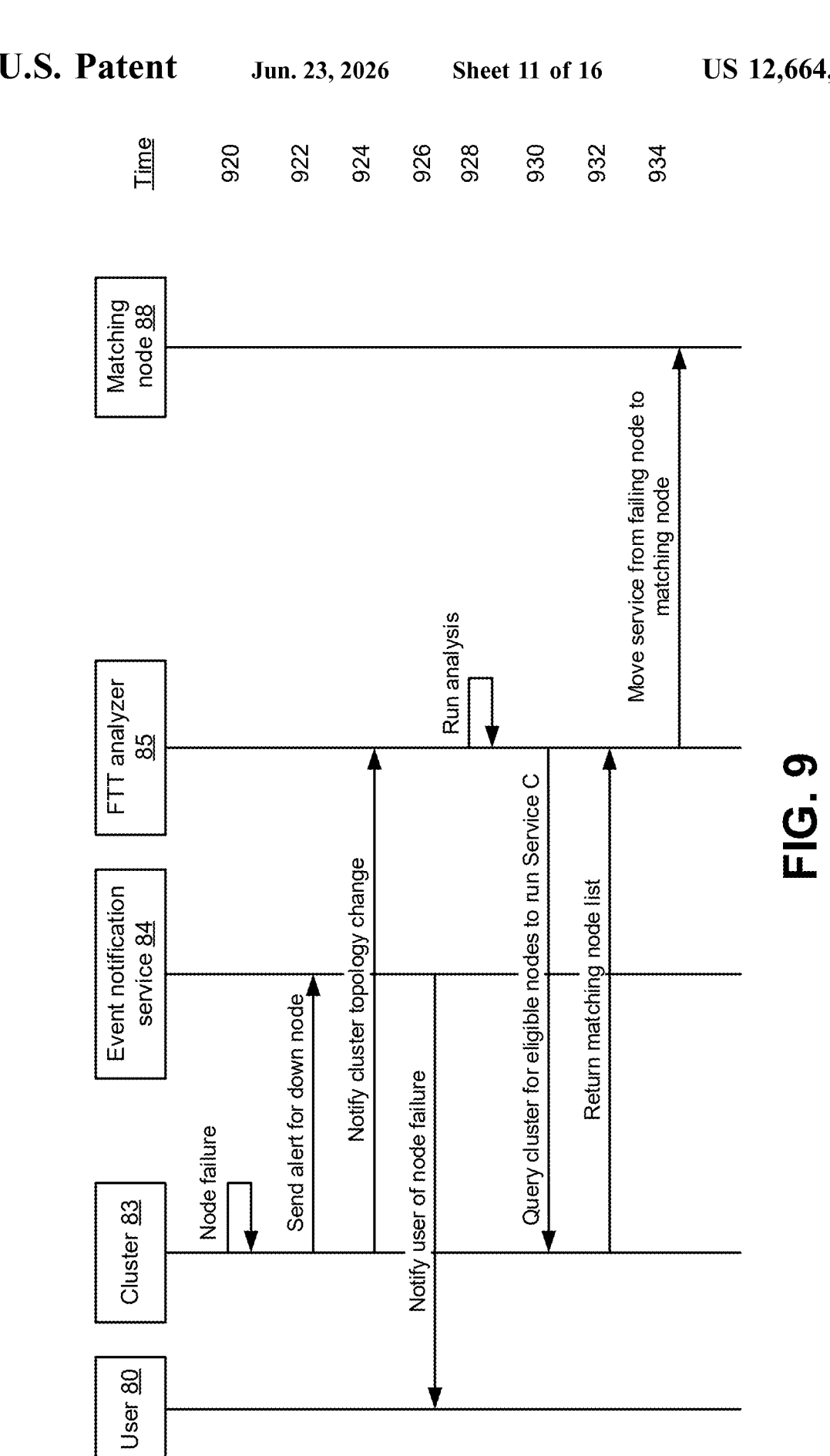

Turning next to FIGS. 8-10, diagrams illustrating respective procedures that can be performed in connection with one or more implementations described herein are illustrated. Referring to FIG. 8, an example procedure that can be performed for a cloud deployment is illustrated. For purposes of readability, FIG. 8 is divided into three sub-figures denoted as FIGS. 8A-8C, which respectively show different phases of a common procedure. It is also noted that, to further simplify the drawings, only the entities that are involved in a given phase of the procedure are shown in the drawing corresponding to that phase.

In the example cloud deployment use case illustrated by FIG. 8, the cluster 83 associated with the procedure has N=7 nodes, where all N nodes are up and running at the time the procedure shown in FIG. 8 begins. Additionally, three services are considered, referred to herein as Services A-C. Services A and B both have minimum instance counts of N/2+1 instances (i.e., 4 instances where N=7), while Service C has a minimum instance count of 5 instances. Each of Services A-C are running on each of the nodes of the cluster 83 at the time the procedure shown in FIG. 8 begins.

The procedure shown by FIG. 8 begins at time 802 as illustrated by FIG. 8A, in which a first node of the cluster 83 fails. In response to this node failure, the cluster 83 can send an alert for the failed node to an event notification service 84 associated with the cluster 83 at time 804. Additionally, the cluster can notify an FTT analyzer 85 (e.g., implemented via system 100 as described above with respect to FIG. 1) of the resulting cluster topology change at time 806. At time 808, the event notification service 84 can notify a user 80 of the cluster 83 regarding the node failure at time 802, e.g., via an alert module 710 as described above with respect to FIG. 7.

At time 810, the FTT analyzer 85 can run an analysis to determine, e.g., whether any FTT thresholds associated with any of Services A-C have been reached. As a result of this analysis, the FTT analyzer 85 can determine that no critical FTT thresholds have been reached, e.g., due to 6 operational nodes remaining in the cluster 83 whereas the minimum instance count for Service C is 5. However, in the example shown by FIG. 8A, the FTT analyzer 85 is configured to send a warning event for Service C to the event notification service 84 at time 812, e.g., due to the inability of Service C to tolerate an additional failure without reaching its critical threshold. Subsequently, the event notification service 84 can notify the user 80 regarding this warning event at time 814.

In the next phase of the procedure as shown by FIG. 8B, a second node of the cluster 83 can fail at time 820 prior to the first node failure being remedied. As an immediate result of the failure, the cluster 83 can report the second failed node to the event notification service 84 and FTT analyzer 85 at times 822 and 824, respectively, in a similar manner to that described above at times 804 and 806. The event notification service 84 can then notify the user 80 of the failure at time 826.

At time 828, the FTT analyzer 85 can then repeat the analysis performed at time 810 for the second node failure. Because, as a result of the second node failure, the number of operational nodes now equals the critical FTT threshold for Service C (i.e., 5 nodes), the FTT analyzer 85 can then take action to spin up temporary cloud resources for Service C. Thus, at time 830, the FTT analyzer 85 can expand the backend IP range of the cluster 83 for a new diskless node, and at time 832 the FTT analyzer 85 can create a new diskless node, e.g., via an API call to a cloud provider 86 associated with the cluster 83 and/or other suitable actions. As a result of the actions of the FTT analyzer 85, the cloud provider 86 can create a new VM at 834 as a diskless node 87, and at time 836 this new diskless node 87 can then join the cluster 83. The diskless node 87 can then spin up one or more services, including Service C, at time 838, and at time 840 the cluster 83 can notify the FTT analyzer 85 of the resulting topology change. At time 842, the FTT analyzer 85 can repeat its analysis, e.g., as triggered by the topology change at time 840. Here, the FTT analyzer 85 determines that the additional diskless node 87 allows Service C to maintain its FTT requirements. As a result, no further actions are performed at time 842.

In the final phase of the procedure as shown by FIG. 8C, a user 80 of the cluster 83 can remedy one or more of the previously failed VMs at time 850, and these VM(s) 81 can re-merge with the cluster 83 at time 852. At time 854, the VM(s) 81 re-merging with the cluster 83 causes the cluster 83 to notify the FTT analyzer 85 of the relevant topology change(s), which in turn triggers further analysis by the FTT analyzer 85 at time 856. At time 856, the FTT analyzer 85 can determine that Service C can now run without the diskless node 87. As a result, the FTT analyzer 85 can initiate removal of the diskless node 87 from the cluster 83 at time 860, and this removal can be carried out by the cluster 83 at time 860. Finally, the FTT analyzer 85 can delete the cloud resources associated with the diskless node 87 at time 862, e.g., by submitting a second API call to the cloud provider 86.

With regard to the procedure shown by FIG. 8, it is noted that a failure of a diskless node 87 created by the FTT analyzer 85 can be handled similarly to failures of any other node in the system, e.g., via issuance of event notifications, initialization of additional diskless nodes 87, and/or any other suitable actions.

Turning next to FIG. 9, an example procedure that can be performed to facilitate service movement based on node capability criteria is illustrated. Here, the cluster 83 associated with the procedure has N=6 nodes running a set of services (Services A-C), where all N nodes are up and running at the time the procedure shown in FIG. 9 begins. Services A and B both have minimum instance counts of N/2+1 instances (i.e., 4 instances where N=6) and Service C has a minimum instance count of 5 instances. In addition, Service C requires each associated node to have a 100 Gbps NIC.

The procedure shown in FIG. 9 begins in response to a failure of one of the nodes of the cluster 83 running Services A-C at time 920, in response to which the cluster 83 and an associated event notification service 84 can facilitate notifying a user 80 of the node failure at times 922-926 in a similar manner to that described above with respect to times 822-826 in FIG. 8B. This can trigger an analysis by the FTT analyzer 85 at time 928, which determines as a result of the node failure that Service C has reached its critical FTT threshold.

As a result of the analysis performed at time 928, the FTT analyzer 85 can audit the cluster 83 for nodes that are not running Service C and meet the capability criteria for said service. For instance, the FTT analyzer 85 can query the cluster 83 for eligible nodes at time 930, based on which the cluster 83 can provide a list of nodes that match the capability criteria at time 932. Subsequently, at time 934, the FTT analyzer 85 can move the service from the node that failed at time 920 to a matching node 88 identified by the cluster 83 at time 932.

Figure 10A:
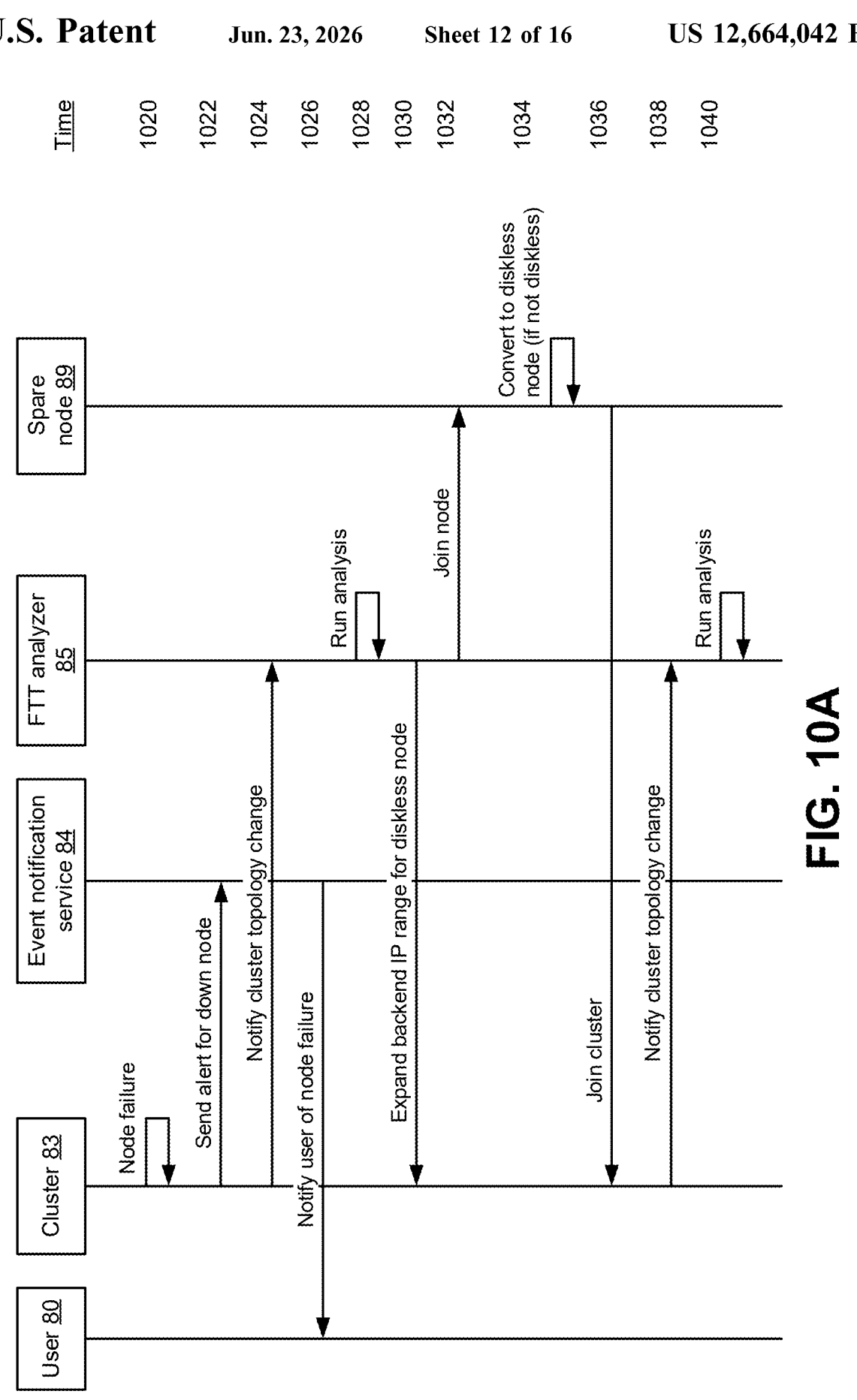
Figure 10B:
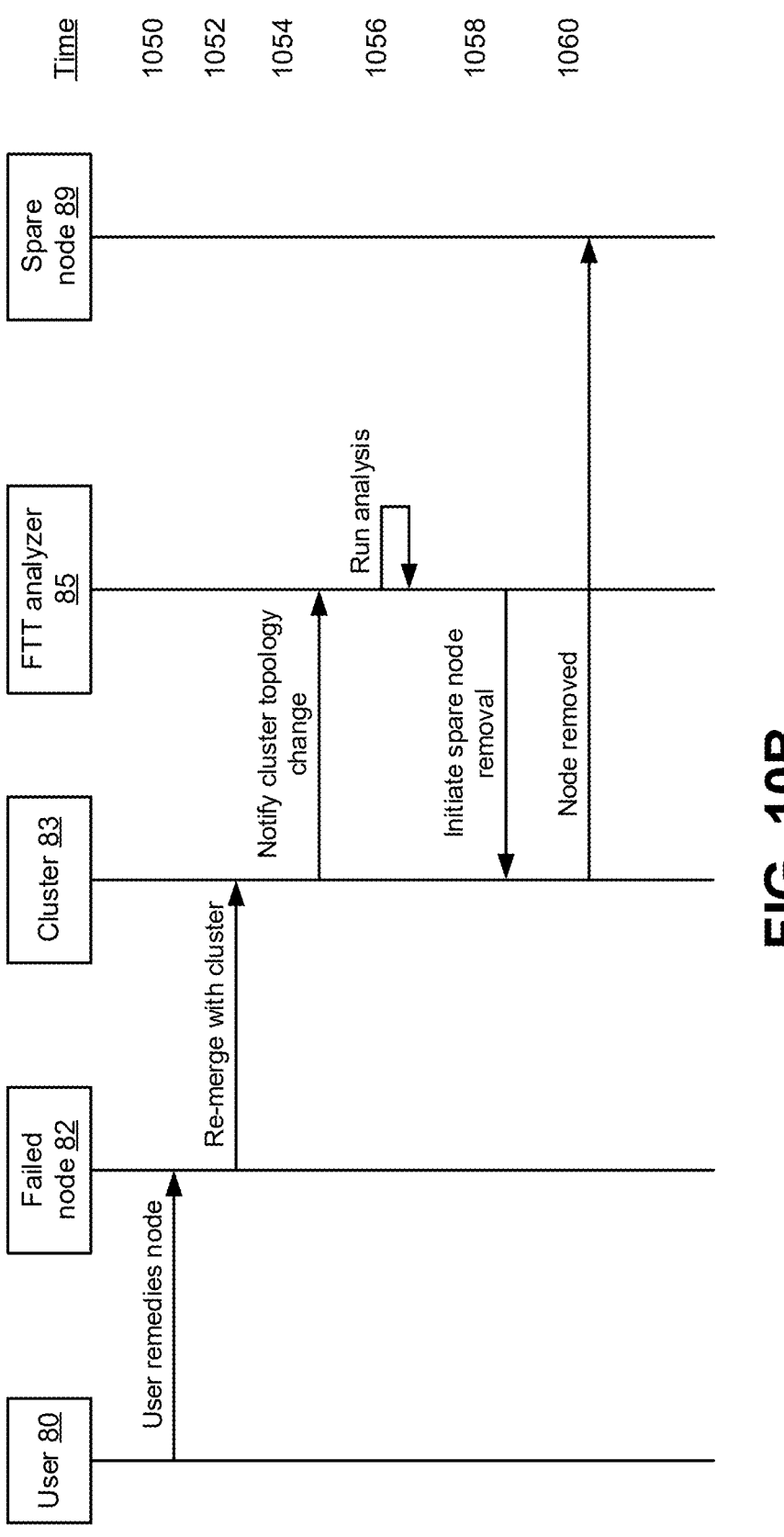

Referring now to FIG. 10, an example procedure that can be performed for a hardware deployment with standby nodes is illustrated. For purposes of readability, FIG. 10 is divided into two sub-figures denoted as FIGS. 10A-10B, which respectively show different phases of a common procedure. Here, the cluster 83 associated with the procedure has N=6 nodes running a set of services (Services A-C), where all N nodes are up and running at the time the procedure shown in FIG. 10 begins. Services A and B both have minimum instance counts of N/2+1 instances (i.e., 4 instances where N=6) and Service C has a minimum instance count of 5 instances.

The procedure shown by FIG. 10 begins at time 1020 as illustrated by FIG. 10A, in which a node of the cluster 83 fails. The cluster 83 and an associated event notification service 84 can facilitate notifying an FTT analyzer 85 and a user 80 of the cluster 83 of the failure as shown at times 1022-1026 in a similar manner to that described above with respect to times 822-826 in FIG. 8B. This can trigger an analysis by the FTT analyzer 85 at time 1028, which determines as a result of the node failure that Service C has reached its critical FTT threshold.

Because, as a result of the node failure, the number of operational nodes now equals the critical FTT threshold for Service C (i.e., 5 nodes), the FTT analyzer 85 can then take action to spin up temporary resources for Service C. Thus, at time 1030, the FTT analyzer 85 can expand the backend IP range of the cluster 83 for a new diskless node, and at time 1032 the FTT analyzer 85 can instruct a spare node 89 to join the cluster 83. At time 1034, the spare node 89 can be converted to a diskless node if it is not already configured as such. Subsequently, at time 1036, the spare node 89 can join the cluster 83. At time 1038, the cluster 83 can notify the FTT analyzer 85 of the resulting topology change. At time 1040, the FTT analyzer 85 can repeat its analysis, e.g., as triggered by the topology change at time 1038. Here, the FTT analyzer 85 determines that the additional node allows Service C to maintain its FTT requirements. As a result, no further actions are performed at time 1040.

In the next phase of the procedure as shown by FIG. 10B, a user 80 of the cluster 83 can remedy one or more of the failed nodes 82 at times 1050-1054, e.g., in a similar manner to that described above with respect to times 850-854 described above with respect to FIG. 8C. The FTT analyzer 85 can perform further analysis at time 1056 based on the resulting topology change. At this time, the FTT analyzer 85 can determine that Service C can now run without the spare node 89. As a result, the FTT analyzer 85 can initiate removal of the spare node 89 from the cluster 83 at time 860, e.g., using existing procedures for removing a node from a cluster. This removal can then be carried out by the cluster 83 at time 1060.

Turning to FIG. 11, a flow diagram of a method 1100 that facilitates analysis and remediation of service availability based on FTT is illustrated. At 1102, in response to detecting a change to an operational state of a computing cluster (e.g., a computing cluster 10), a system comprising at least one processor (e.g., a processor 104) can compare (e.g., by a state monitor 110) a number of first instances of a computing service running at respective first locations of the computing cluster to a threshold number of instances of the computing service. Here, the threshold number of instances is defined based on a number of failures associated with the computing service, that is able to be tolerated.

At 1104, the system can determine whether the number of first instances of the computing service equals the threshold number defined at 1102. If these numbers are not equal, method 1100 can return to 1102 to handle subsequent changes to the cluster operational state. Alternatively, if the numbers are determined at 1104 to be equal, method 1100 can proceed to 1106, at which the system can initialize (e.g., by a node initializer 120) at least one second location of the computing cluster for performance of the computing service. The at least one second location initialized at 1106 can be distinct from each of the respective first locations.

At 1108, the system can instantiate (e.g., by a service instantiator 130) at least one second instance of the computing service at the at least one second location of the computing cluster as initialized at 1106.

Referring next to FIG. 12, a flow diagram of a method 1200 that can be performed by at least one processor, e.g., based on machine-executable instructions stored on a non-transitory machine-readable medium, is illustrated. An example of a computer architecture, including a processor and non-transitory media, that can be utilized to implement method 1200 is described below with respect to FIG. 13.

Method 1200 can begin at 1202, in which the at least one processor can compare, in response to detecting a change to an operational state of a computing cluster, a number of first instances of a computing service running at respective first locations of the computing cluster to a threshold number of instances of the computing service, where the threshold number of instances is associated with a failures-to-tolerate threshold of the computing service.

At 1204, the at least one processor can determine whether the number of first instances of the computing service is less than or equal to the threshold number defined at 1202. If the number of first instances is greater than the threshold number, method 1200 can return to 1202 to handle subsequent changes to the cluster operational state. Otherwise, method 1200 can proceed to 1206, at which the at least one processor can initialize at least one second location of the computing cluster for performance of the computing service, the at least one second location being different from any of the respective first locations.

At 1208, the at least one processor can start at least one second instance of the computing service at the at least one second location of the computing cluster as initialized at 1206.

FIGS. 11-12 as described above illustrate methods in accordance with certain embodiments of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain embodiments of this disclosure.

Figure 13:
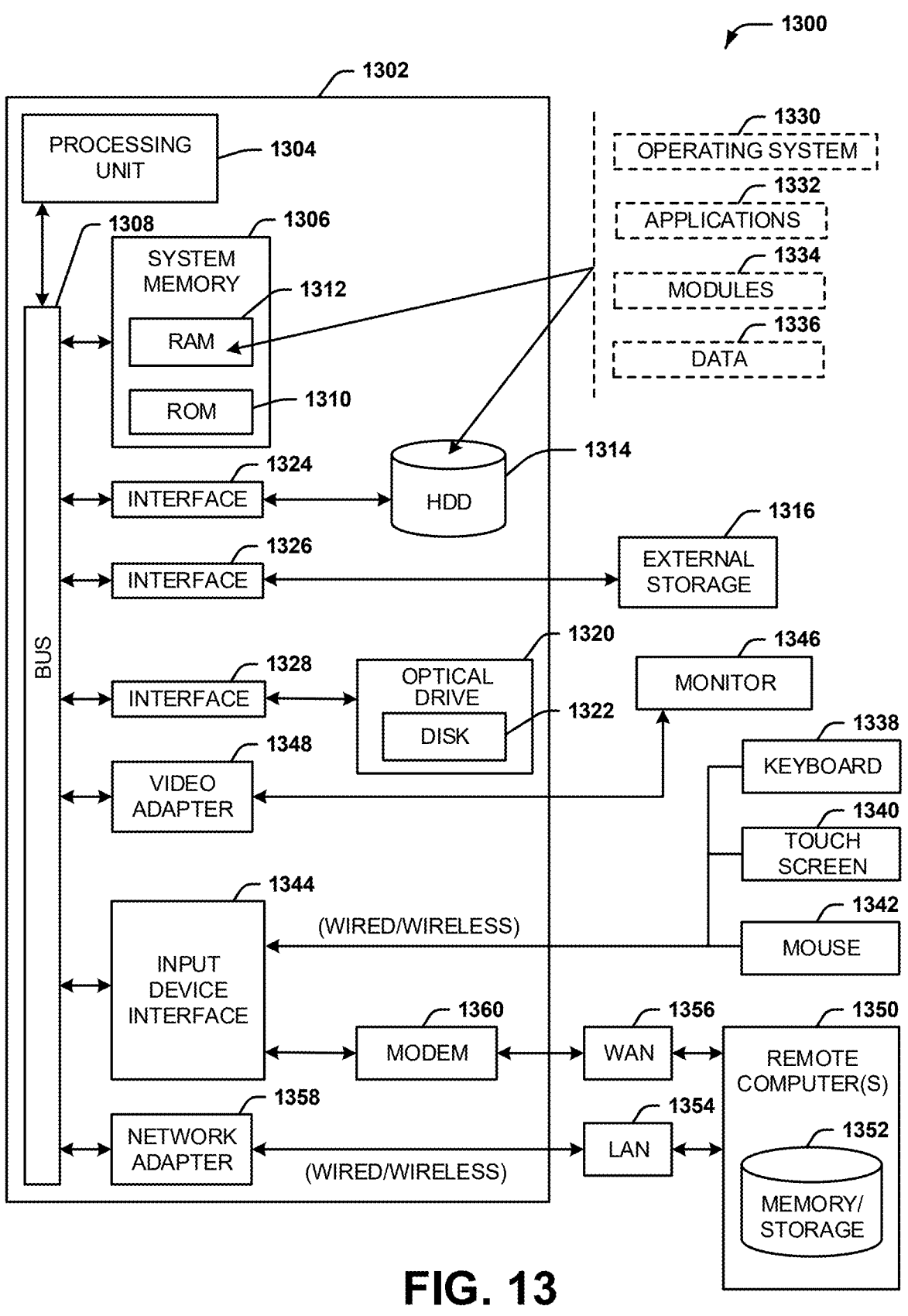
FIG. 13 is a diagram of an example computing environment in which various implementations described herein can function.

In order to provide additional context for various embodiments described herein, FIG. 13 and the following discussion are intended to provide a brief, general description of a suitable computing environment 1300 in which the various embodiments of the embodiment described herein can be implemented. While implementations have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference now to FIG. 13, an example general-purpose environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD), a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any embodiment or design described herein as "exemplary" and/or "demonstrative" is not necessarily to be construed as preferred or advantageous over other embodiments or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive-in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
at least one processor; and
at least one memory that stores executable instructions that, when executed by the at least one processor, facilitate performance of operations, the operations comprising:
in response to detecting a change to an operational state of a computing cluster, comparing a number of first instances of a computing service running at respective first locations of the computing cluster to a threshold number of instances of the computing service, the threshold number of instances being associated with maintaining continued functionality of the computing service on the computing cluster; and
in response to determining, as a result of the comparing, that the number of first instances of the computing service is no greater than the threshold number of instances:
initializing at least one second location of the computing cluster for performance of the computing service, the at least one second location being distinct from each of the respective first locations, the initializing comprising converting a cluster node corresponding to the at least one second location from a storage node that provides storage via a clustered file system associated with the computing cluster to a diskless node that is not part of the clustered file system; and
instantiating at least one second instance of the computing service at the at least one second location of the computing cluster.

2. The system of claim 1, wherein the respective first locations of the computing cluster comprise respective first nodes of the computing cluster, and wherein the cluster node corresponding to the at least one second location is a second node of the computing cluster, the second node being distinct from the respective first nodes.

3. The system of claim 2, wherein the computing cluster is associated with a cloud computing system, and wherein the initializing of the at least one second location comprises initializing the second node as a new diskless virtual machine within the cloud computing system.

4. The system of claim 1, wherein the respective first locations of the computing cluster comprise respective first nodes of the computing cluster, wherein the initializing of the at least one second location of the computing cluster comprises selecting, as the at least one second location, a second node of the computing cluster that is determined to be capable of running the computing service based on a configuration of the second node, and wherein the second node is not any of the respective first nodes.

5. The system of claim 4, wherein the operations further comprise:
obtaining, prior to the detecting of the change to the operational state of the computing cluster, service registration information associated with the computing service, the service registration information comprising a group of node capabilities associated with running the computing service, wherein the selecting of the second node comprises selecting the second node based on a result of comparing the configuration of the second node to the group of node capabilities.

6. The system of claim 1, wherein the computing cluster is associated with a cloud computing system, wherein the initializing of the at least one second location comprises instantiating a new cloud native container within the cloud computing system, and wherein the instantiating of the at least one second instance of the computing service comprises instantiating the at least one second instance of the computing service within the new cloud native container.

7. The system of claim 1, wherein the change to the operational state of the computing cluster is a first change, and wherein the operations further comprise:

in response to detecting a second change to the operational state of the computing cluster that is after the first change, repeating the comparing of the number of first instances of the computing service running at the respective first locations of the computing cluster to the threshold number of instances of the computing service; and in response to determining, as a result of the repeating of the comparing, that the number of first instances of the computing service is greater than the threshold number of instances, de-instantiating the at least one second instance of the computing service at the at least one second location of the computing cluster.

8. The system of claim 7, wherein the respective first locations of the computing cluster comprise respective first nodes of the computing cluster, wherein the at least one second location of the computing cluster comprises a second node of the computing cluster, and wherein the operations further comprise:

in further response to determining, as a result of the repeating of the comparing, that the number of first instances of the computing service is greater than the threshold number of instances, removing the second node from the computing cluster.

9. The system of claim 1, wherein the operations further comprise:

receiving registration information from the computing service, the registration information comprising data indicative of the threshold number of instances.

10. The system of claim 1, wherein the threshold number of instances is a first threshold number of instances, and wherein the operations further comprise:

in response to determining, as a result of the comparing, that the number of first instances of the computing service is no greater than a second threshold number of instances that is greater than the first threshold number of instances, generating an event notification, the event notification comprising an indication of the number of first instances of the computing service.

11. The system of claim 1, wherein the initializing of the second location further comprises rebooting the cluster node in response to the converting of the cluster node, and wherein the instantiating of the at least one second instance of the computing service is in response to the rebooting being determined to have completed successfully.

12. A method, comprising:

in response to detecting a change to an operational state of a computing cluster, comparing, by a system comprising at least one processor, a number of first instances of a computing service running at respective first locations of the computing cluster to a threshold number of instances of the computing service, wherein the threshold number of instances is defined based on a number of failures, associated with the computing service, that is able to be tolerated; and in response to determining that the number of first instances of the computing service is equal to the threshold number of instances:

initializing, by the system, at least one second location of the computing cluster for performance of the computing service, the at least one second location being distinct from each of the respective first locations, the initializing comprising converting a cluster node corresponding to the at least one second location from a storage node that provides storage via a clustered file system associated with the computing cluster to a diskless node that is not part of the clustered file system; and instantiating, by the system, at least one second instance of the computing service at the at least one second location of the computing cluster.

13. The method of claim 12, wherein the respective first locations of the computing cluster comprise respective first nodes of the computing cluster, and wherein the cluster node corresponding to the at least one second location is a second node of the computing cluster.

14. The method of claim 13, wherein the computing cluster is associated with a cloud computing system, and wherein the initializing of the at least one second location comprises initializing the second node as a new diskless virtual machine within the cloud computing system.

15. The method of claim 12, wherein the respective first locations of the computing cluster comprise respective first nodes of the computing cluster, wherein the initializing of the at least one second location of the computing cluster comprises selecting, as the at least one second location, a second node of the computing cluster that is determined to be capable of running the computing service based on a configuration of the second node, and wherein the second node is not any of the respective first nodes.

16. A non-transitory machine-readable medium comprising computer executable instructions that, when executed by at least one processor, facilitate performance of operations, the operations comprising:

comparing, in response to detecting a change to an operational state of a computing cluster, a number of first instances of a computing service running at respective first locations of the computing cluster to a threshold number of instances of the computing service, the threshold number of instances being associated with a failures-to-tolerate threshold of the computing service; and in response to determining that the number of first instances of the computing service is less than or equal to the threshold number of instances:

initializing at least one second location of the computing cluster for performance of the computing service, the at least one second location being different from any of the respective first locations, the initializing comprising converting a cluster node corresponding to the at least one second location from a storage node that provides storage via a clustered file system associated with the computing cluster to a diskless node that is not part of the clustered file system; and starting at least one second instance of the computing service at the at least one second location of the computing cluster.

17. The non-transitory machine-readable medium of claim 16, wherein the respective first locations of the computing cluster comprise respective first nodes of the computing cluster, and wherein the cluster node corresponding to the at least one second location of the computing cluster is a second node of the computing cluster.

18. The non-transitory machine-readable medium of claim 17, wherein the operations further comprise:

adding the second node to the computing cluster in response to the converting of the second node.

19. The non-transitory machine-readable medium of claim 17, wherein the computing cluster is associated with a cloud computing system, and wherein the initializing of the at least one second location comprises initializing the second node as a new service container within the cloud computing system.

20. The non-transitory machine-readable medium of claim 16, wherein the respective first locations of the computing cluster comprise respective first nodes of the computing cluster, wherein the initializing of the at least one second location of the computing cluster comprises selecting, as the at least one second location, a second node of the computing cluster that is determined to be capable of running the computing service based on a configuration of the second node, and wherein the second node is not any of the respective first nodes.

\* \* \* \* \*